United States Patent
Lohmann

(10) Patent No.: US 10,150,521 B2
(45) Date of Patent: Dec. 11, 2018

(54) INDUSTRIAL TRUCK INCLUDING A TRAVELLING DRIVER STAND PLATFORM

(71) Applicant: Jungheinrich Aktiengesellschaft, Hamburg (DE)

(72) Inventor: Helmut Lohmann, Gyhum (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 127 days.

(21) Appl. No.: 15/052,493

(22) Filed: Feb. 24, 2016

(65) Prior Publication Data
US 2016/0244110 A1  Aug. 25, 2016

(30) Foreign Application Priority Data
Feb. 24, 2015  (DE) .................. 10 2015 102 583

(51) Int. Cl.
| | | |
|---|---|---|
| *B62D 51/02* | (2006.01) | |
| *B62D 51/00* | (2006.01) | |
| *B66F 9/075* | (2006.01) | |

(52) U.S. Cl.
CPC ........... *B62D 51/005* (2013.01); *B62D 51/02* (2013.01); *B66F 9/0759* (2013.01)

(58) Field of Classification Search
CPC ...... B62D 51/00; B62D 51/005; B62D 51/02; B66F 9/0759
See application file for complete search history.

(56) References Cited

U.S. PATENT DOCUMENTS

| | | | | |
|---|---|---|---|---|
| 3,774,711 | A * | 11/1973 | Lacey | B60N 2/502 108/136 |
| 5,918,693 | A * | 7/1999 | Mantovani | B62B 3/0612 180/89.13 |
| 7,497,505 | B2 | 3/2009 | Manci et al. | |
| 8,414,065 | B2 | 4/2013 | Jones, Jr. et al. | |
| D756,589 | S * | 5/2016 | Knie | D34/34 |
| 2004/0004349 | A1* | 1/2004 | Swetish | B62D 1/043 280/779 |
| 2006/0255622 | A1* | 11/2006 | Manci | B66F 9/07545 296/190.01 |
| 2007/0207024 | A1* | 9/2007 | Kraimer | B60N 2/24 414/685 |
| 2011/0260502 | A1* | 10/2011 | Yahner | B62D 33/0604 296/190.07 |
| 2012/0239238 | A1* | 9/2012 | Harvey | G05D 1/0221 701/25 |
| 2015/0060199 | A1* | 3/2015 | Overfield | B66F 9/105 182/69.4 |
| 2016/0214840 | A1* | 7/2016 | Schuler | B60K 1/04 |

(Continued)

FOREIGN PATENT DOCUMENTS

| | | |
|---|---|---|
| DE | 9300762 | 3/1993 |
| DE | 4214788 | 2/1995 |

(Continued)

*Primary Examiner* — Barry Gooden, Jr.
(74) *Attorney, Agent, or Firm* — Barclay Damon LLP

(57) ABSTRACT

A industrial truck with a drive part, which has a driver stand that has an L-shaped stand platform with a horizontally arranged floor element and a vertically arranged wall element, wherein the floor element is spring-mounted on the drive part by means of at least one spring element and a swing arm, and the wall element has a coupling element that acts on the movement of the stand platform.

16 Claims, 4 Drawing Sheets

(56) References Cited

U.S. PATENT DOCUMENTS

2016/0221810 A1\* 8/2016 Schueler .................. B62B 3/06
2016/0244109 A1\* 8/2016 Lohmann ............. B62D 51/005
2017/0008742 A1\* 1/2017 Hohmann .......... B62D 33/0604
2017/0158474 A1\* 6/2017 Standard ................. B66F 9/065

FOREIGN PATENT DOCUMENTS

| DE | 19524075 | 1/1997 |
|----|----------|--------|
| DE | 10055263 | 5/2002 |
| DE | 69632505 | 5/2005 |
| DE | 10360298 | 7/2005 |
| DE | 60117956 | 11/2006 |
| DE | 102005045505 | 3/2007 |
| DE | 102006009330 | 9/2007 |
| DE | 102006009331 | 9/2007 |

\* cited by examiner

INDUSTRIAL TRUCK INCLUDING A TRAVELLING DRIVER STAND PLATFORM

CROSS REFERENCE TO RELATED APPLICATION

This application is based upon and claims priority to under relevant sections of 35 USC § 119, German Patent Application No. 10 2015 102 583.3, filed Feb. 24, 2015, the entire contents of which are hereby incorporated by reference.

BACKGROUND OF THE INVENTION

The present invention relates to an industrial truck with a drive part having a driver stand.

When traveling on uneven ground, a spring-suspended stand platform is very comfortable. A large, vertical spring excursion decouples the stand platform from the vehicle to provide a form of suspension. Depending on the type of bearing of the stand platform, a large swinging movement by the platform arises over the spring excursion. If the standing surfaces are very wide, lateral swinging and tilting can occur. If the stand platform is frequently mounted and dismounted, an excessive spring excursion is felt to be unsafe and unstable by vehicle drivers.

A standing surface for a standing driver of an industrial truck was disclosed in DE 42 14 788 C2. The standing surface possesses a platform, which is supported by at least one elastically yielding buffer element fixed to the vehicle, wherein a flexible section of a reinforced sheet metal plate on one end is securely connected to the part fixed to the vehicle, and the buffer element abuts the other end of the sheet metal plate.

A spring-suspended driver platform is known from DE 103 60 298 A1 in which the stand platform is spring-suspended by a spring element and additionally dampened by a damping element.

A floor panel for a stand platform of an industrial truck is known from DE 10 2005 045 505 A1. The floor panel is pivotably mounted and pretensioned by a spring in an elevated position, wherein a proximity sensor is arranged below the floor panel. A switching pin is arranged on the bottom side of the floor panel such that it triggers a switching process by overlapping the proximity sensor when the floor panel swings downward against the force of the spring.

DE 10 2006 009 330 A1 discloses a stand platform for a lift truck in which the standing surface is formed by a top floor panel, which is mounted in an articulating manner to a bottom floor panel, and is dampened at its opposing end by spring and/or damping elements.

A stand platform for a lift truck is known from DE 10 2006 009 331 A1, which has a spring-suspended standing surface for an operator, wherein the standing surface is formed by a top floor panel, which is mounted in an articulating manner to a bottom panel. A spring element is arranged between the floor panels and pretensions the top floor panel upward relative to the bottom panel. The top floor panel can be moved downward by the weight of an operator against the force of the spring element, wherein a position sensor is provided for recognizing the position of the top floor panel.

An industrial truck is known from U.S. Pat. No. 7,497,505 as well as U.S. Pat. No. 8,414,065, wherein a spring-mounted floor element is height-adjustable by means of a scissors gear, wherein the resilient effect is held by pretensioned spring elements, which engage with the scissors gear or floor panel. With the known method, lateral instability of the floor platform has proven to be disadvantageous.

BRIEF SUMMARY OF THE INVENTION

The invention provides an industrial truck with a spring-suspended driver stand in which the driver stand is stable over the traveled spring excursion. The industrial truck possesses a drive part, which has a driver stand. The driver stand possesses an L-shaped stand platform having a horizontally arranged floor element and a vertically standing wall element. When using the driver stand, the driver stands on the floor element. The floor element is spring-suspended by means of at least one spring element and a swing arm relative to a frame of the drive part. The wall element possesses a coupling element, which acts on the movement of the stand platform. An approximately linear movement of the stand platform is caused by the coupling element. Preferably, a guide roller is provided as a coupling element, which rolls on a guide fixed to the vehicle. Combining the swing arm and coupling element yields an approximately linear movement of the floor element, which is resilient by means of the spring element. In the following, the spring element will not only be understood as a spring element possessing elastic properties. Instead, a damping effect of the spring element is also always included. Consequently, spring elements according to the invention are also to be understood as a spring and/or damping element.

In one embodiment, the swing arm has at least one arm, which is articulating at one end to the frame of the drive part, and another end is articulating to the floor element. The floor element swings on the articulating arm, wherein the at least one arm of the swing arm is articulating at the end projecting from the wall element to the floor element. This brings about an approximately linear movement of the floor element.

In one embodiment, the swing arm possesses two arms connected to each other by a transverse arm. In this context, the arms are preferably designed as rigid arms, and the transverse arm preferably creates a torsion-resistant connection between the two rigid arms. With this embodiment of the swing arm, lateral tipping of the floor element can be avoided. Even in the event of a one-sided load, the arms move evenly, and the floor element accordingly moves up and down without a tipping movement.

In one embodiment, the guide roller is arranged on the end of the wall element projecting away from the floor element, wherein the guide is arranged on the side facing the floor element. Preferably, a guide element fixed to the vehicle is provided, which is connected via a pair of side legs to the vehicle and forms the guide for the guide roller. The side legs are directly connected to the vehicle, or respectively a vehicle frame, or to a frame provided to be fastened to the vehicle. In particular when the swing arm is arranged at a distance from the wall element, it is advantageous for the stability of the driver stand platform when the guide roller rolls on the side facing the floor element.

In one embodiment, a position sensor is provided, which interacts with the wall element and/or the guide roller. Preferably, the position sensor is arranged above the guide roller and detects the position of the guide roller when the stand platform is in an unloaded position. Preferably, the position sensor generates a deadman signal when the position sensor detects the position of an unloaded stand platform.

In one embodiment, a spring element is arranged on the side of the floor element facing the wall element and interacts with the floor element. The spring element can be attached directly to the vehicle or to the frame provided for fastening the stand platform to the vehicle.

BRIEF DESCRIPTION OF THE DRAWINGS

An embodiment of the industrial truck according to the invention is explained in greater detail below. In the figures.

DETAILED DESCRIPTION OF THE INVENTION

Figure 1:
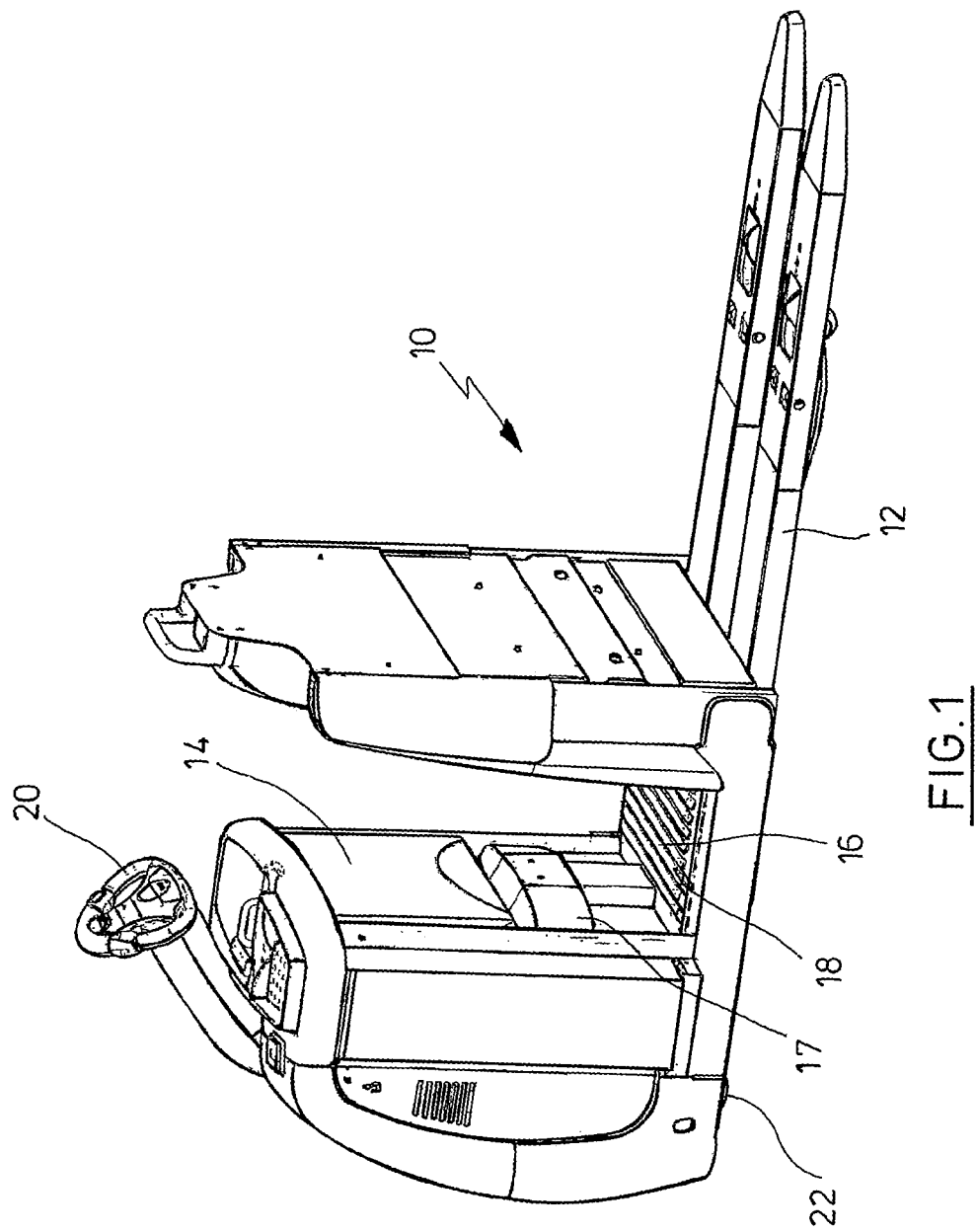
FIG. 1 shows a perspective view at an angle from the front of the industrial truck with a spring-suspended stand platform.

FIG. 1 shows an industrial truck 10, which has a drive part 14 and a load part 12. The drive part 14 possesses a driver stand 16 on which a pressure-sensitive mat 18 is located. Standing on the driver stand 16, an operator has access to the operating elements 20 by means of which, for example, a driven wheel 22 on the drive part is controlled. A cover 17 is also shown.

Figure 2:
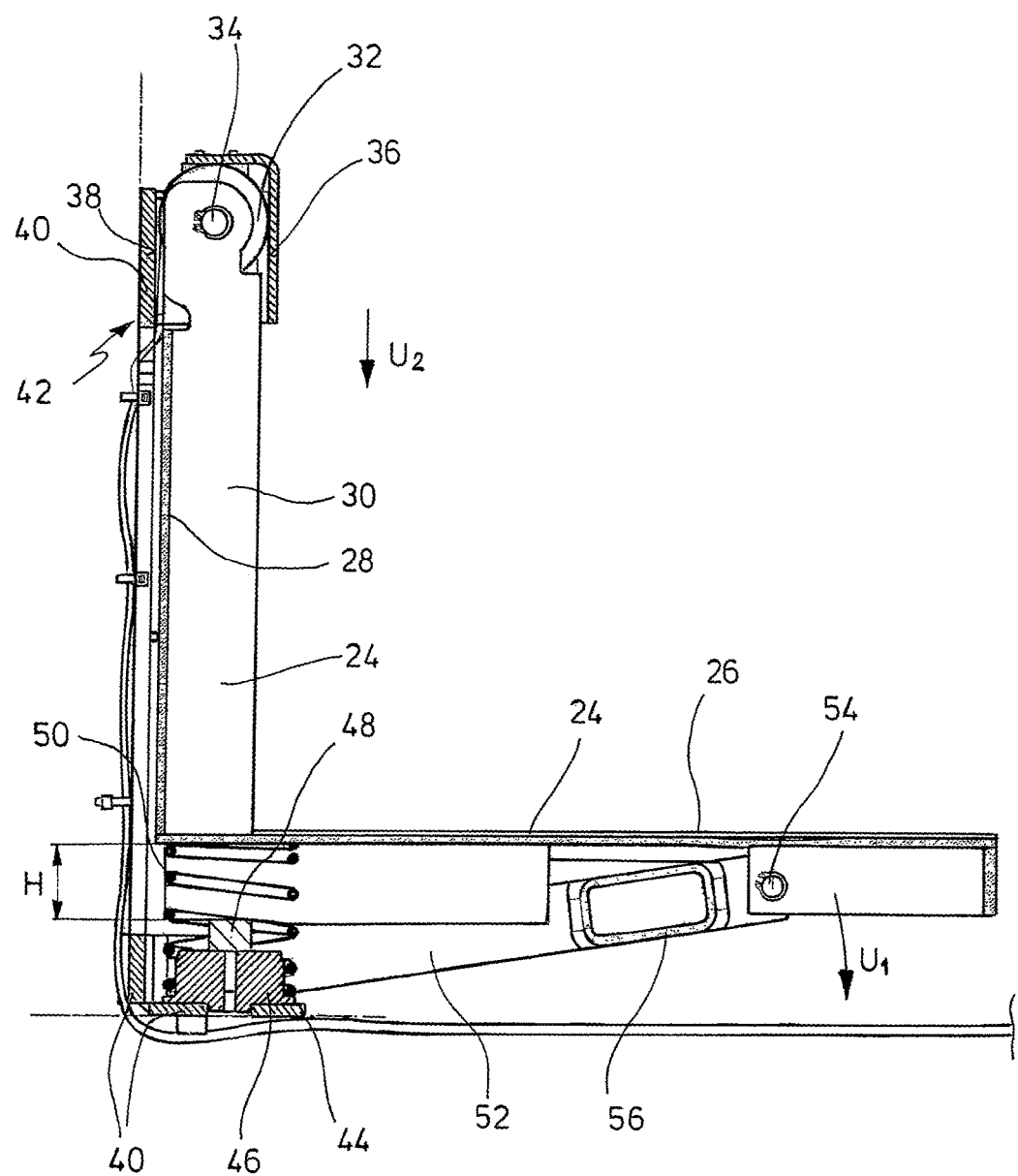
FIG. 2 shows a cross-section of the driver stand.

FIG. 2 shows a section of the driver stand 16 of FIG. 1. The driver stand 16 possesses an L-shaped stand platform 24, which possesses a floor element 26 and a wall element 28. The floor element 26 and wall element 28 are at a right angle to each other, wherein the wall element 28 is arranged on the side of the floor element 26 facing away from the load part 12 (FIG. 1). The wall element 28 possesses a vertically running bar 30 on the end of which a guide roller 32 is mounted on an axle 34. On the side facing the floor element 26, the guide roller 32 abuts the guide 36 and rolls along the guide. On the side opposite the guide 36, a running surface 38 of a frame 40 is provided. Basically, the frame 40 consists of a rear wall forming the running surface 38, as well as a vertical flange surface 42 and a horizontal flange surface 44. Vertical and horizontal flange surfaces are connected to each other and can, for example, be attached to a frame fixed to the vehicle. On the horizontal flange surface 44, there is a projection 46, which bears a stop buffer 48 in the center. Furthermore, a spring 50 is arranged on the projection 46 and acts between the horizontal flange surface 44 and horizontal floor element 26. The pressure sensitive mat 18 and cover 17 shown on FIG. 1 are not shown on FIG. 2.

If the floor element 26 is loaded with a weight, the spring 50 is compressed, and the floor element 26 lowers in an approximately linear movement. The stroke travelled in this context is designated H on FIG. 2.

The stroke movement of the floor element 26 is executed by two rigid arms 52, which are pivotably articulating to the floor element 26 at the bearing point 54. At the end facing the bearing point 54, the rigid arms 52 possess a torsion-resistant transverse arm 56, which is designed as a rectangular pipe as shown in FIG. 2. The second articulation of the rigid arm 52 is covered behind the projection 46. At its end facing the frame 40, the arm 52 is articulating to the horizontal flange surface 44 (covered in FIG. 2).

When the floor element 26 is loaded with a weight, the floor element 26 swings with nearly linear movement in the direction of the arrow U1 and is thereby converted by the guide roller 32 in the guide 36 into a linear movement U2. In the event of a stroke within the range of 30 mm to 40 mm, the deviation in a horizontal direction is only a few millimeters.

Figure 3:
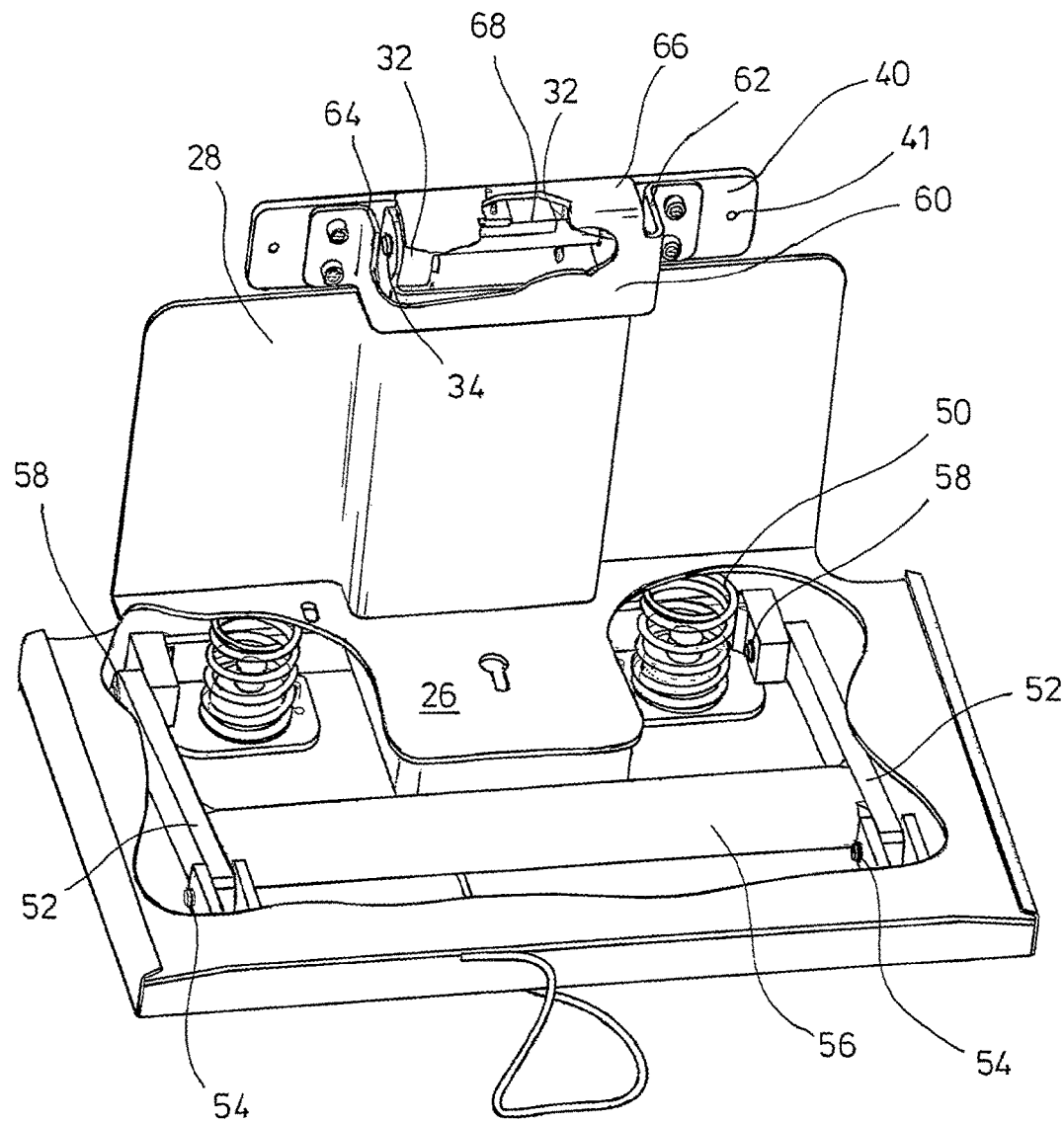
FIG. 3 shows a partially cutaway view of the stand platform.
Figure 4:
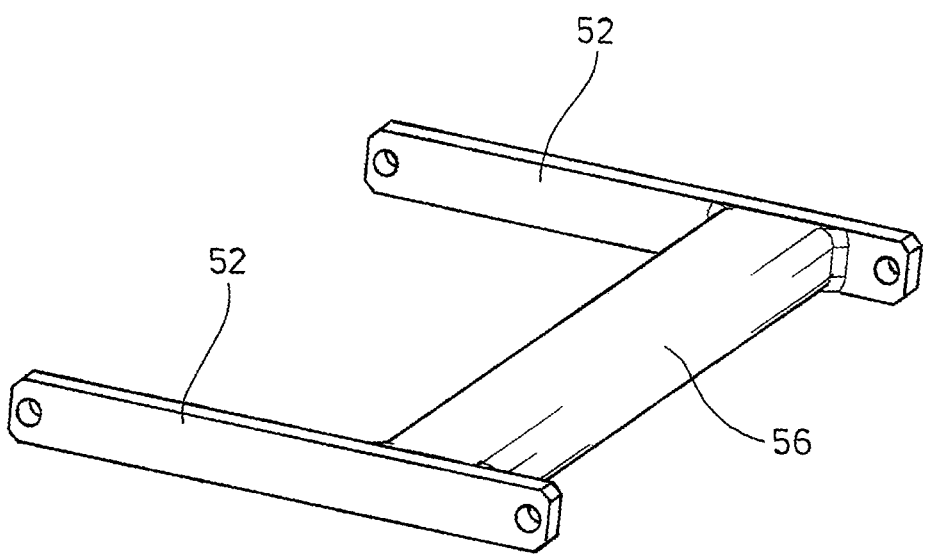
FIG. 4 shows the swing arm consisting of two arms and one transverse arm.

In a partially cut away of floor element 26, FIG. 3 shows the structure of the double swing arm under the floor element 26. As can be seen in FIG. 3 and FIG. 4, the swing arm consists of two arms 52 arranged parallel to each other, which are connected by the torsion-resistant connection 56. The torsion-resistant connection of the two rigid arms 52 ensures that only 1 degree of freedom must be limited by the guide roller. The arms 52 are each pivotably mounted to the frame 40 on the side facing the wall element 28 in a bearing point 58. The springs 50 are arranged on a projection 46 (FIG. 2) between the arms 52.

In FIG. 2 and FIG. 3, it can be seen that two guide rollers 32 are provided, which are arranged on the end of a bar 30 (FIG. 2) of the wall element 28. The bar 30 arises from a rectangular projecting section of the wall element 28. The guide rollers 32 arranged on the end of the bars 30 are located within a guide element 60, the side legs 62 and 64 of which are mounted securely to the vehicle through bore holes 41 in the frame 40. In the area between the side legs 62 and 64, there is a guide surface on which the two guide rollers 32 roll. The guide element 60 also possesses a tongue 66, which is bent toward the side legs 62, 64. The tongue 66 forms the top stop of the stroke movement and limits the upward path of the guide rollers 32.

On the side of the cover tongue 66 facing the guide rollers 32, a position sensor 68 is provided, which detects an approach of the guide rollers 32 or their axle 34. The position sensor 68 serves as a deadman switch since a signal is generated when the guide rollers leave the position sensor due to a load on the floor element. It can thereby be determined whether or not a person is on the floor element 26.

The invention claimed is:

1. An industrial truck having a drive part, comprising:
a driver stand including an L-shaped stand platform having a horizontally-arranged floor element and a vertically-arranged wall element;
a frame attached to the drive part;
a spring element interposing the floor element and the frame, the spring element mounting the floor element to the frame; and
a swing arm including a pair of arms connected by at least one transverse arm, the pair of arms articulately mounting to the frame at one end and articulately mounting to the floor element at the other end;
a coupling element disposed in combination with the wall element and configured to guide movement of the stand platform.

2. The industrial truck according to claim 1, wherein one end of the pair of arms projects from the wall element.

3. The industrial truck according to claim 1, wherein the spring element is arranged on a side of the floor element facing the wall element.

4. The industrial truck according to claim 1, further comprising a position sensor configured to interact with one of the wall element and a guide roller.

5. The industrial truck according to claim 4, wherein the position sensor is configured to generate a deadman signal when the position sensor detects a position corresponding to of one of the coupling element and an axle thereof being in an unloaded state.

6. The industrial truck according to claim 1, wherein the coupling element is a guide roller.

7. The industrial truck according to claim 6, wherein the guide roller is arranged on an end of the wall element projecting away from the floor element, and wherein a guide is disposed on a side facing the floor element.

8. The industrial truck according to claim 6, further comprising a guide element fixed to the frame, and wherein the guide element includes a pair of side legs connected to the frame and a guide configured to guide the guide roller during movement of the stand platform.

9. An industrial truck having a drive part, comprising:
- a driver stand including an L-shaped stand platform having a horizontally-arranged floor element and a vertically-arranged wall element;
- a frame attached to the drive part;
- a spring element interposing the floor element of the driver stand and the frame, the spring element mounting the floor element to the frame;
- a swing arm mounting to the frame at one end and to the floor element at the other end;
- a coupling element disposed in combination with the wall element and configured to guide movement of the stand platform; and
- a position sensor mounted above the coupling element, configured to interact with one of the coupling element and the wall element, and configured to detect a position of one of the coupling element and an axle thereof when the L-shaped stand platform is in an unloaded state.

10. The industrial truck according to claim 9, wherein the position sensor is configured to generate a deadman signal when the position sensor detects the position corresponding to of one of the coupling element and the axle being in the unloaded state.

11. The industrial truck according to claim 9, wherein the spring element is disposed on a side of the floor element facing the wall element.

12. The industrial truck according to claim 9, wherein the swing arm includes at least one arm articulately mounting to the frame at one end and articulately mounting to the floor element at the other end.

13. The industrial truck according to claim 12 wherein the swing arm includes a pair of arms and at least one transverse arm connecting the pair of arms.

14. The industrial truck according to claim 9, wherein the coupling element is a guide roller.

15. The industrial truck according to claim 14, wherein the guide roller is arranged on an end of the wall element projecting away from the floor element, and wherein a guide is disposed on a side facing the floor element.

16. The industrial truck according to claim 14, further comprising a guide element affixed to the frame, the guide element connecting to the frame by a pair of side legs and defining a guide configured to guide the guide roller during movement of the stand platform.

* * * * *